United States Patent
Wu

(10) Patent No.: US 10,630,545 B2
(45) Date of Patent: Apr. 21, 2020

(54) DEVICE AND METHOD OF HANDLING COMMUNICATIONS IN DUAL CONNECTIVITY

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/960,577

(22) Filed: Apr. 24, 2018

(65) Prior Publication Data

US 2018/0309628 A1 Oct. 25, 2018

Related U.S. Application Data

(60) Provisional application No. 62/490,001, filed on Apr. 25, 2017.

(51) Int. Cl.
*H04L 12/24* (2006.01)
*H04W 76/15* (2018.01)
*H04W 24/10* (2009.01)
*H04W 76/27* (2018.01)

(52) U.S. Cl.
CPC ......... *H04L 41/0813* (2013.01); *H04W 24/10* (2013.01); *H04W 76/15* (2018.02); *H04W 76/27* (2018.02)

(58) Field of Classification Search
CPC . H04W 76/19; H04W 24/10; H04W 36/0022; H04W 36/0066; H04W 76/15; H04W 76/27; H04L 41/0813
See application file for complete search history.

(56) References Cited

U.S. PATENT DOCUMENTS

2011/0143660 A1 * 6/2011 Iwamura ............... H04W 76/19
455/39
2017/0034709 A1 2/2017 Hapsari

FOREIGN PATENT DOCUMENTS

| EP | 3041310 A1 | 7/2016 |
| WO | 2015/108382 A1 | 7/2015 |
| WO | 2016/046756 A1 | 3/2016 |

OTHER PUBLICATIONS

3GPP TS 37.340 V15.0.0, Dec. 2017.
Search Report dated Sep. 11, 2018 for EP application No. 18169216.1, pp. 1-4.

* cited by examiner

*Primary Examiner* — Natasha W Cosme
(74) *Attorney, Agent, or Firm* — Winston Hsu

(57) ABSTRACT

The present invention relates to a method and an apparatus for handling measurement object configurations configured by a master base station and a secondary base station in dual connectivity in a mobile communication system.

11 Claims, 5 Drawing Sheets

DEVICE AND METHOD OF HANDLING COMMUNICATIONS IN DUAL CONNECTIVITY

CROSS REFERENCE TO RELATED APPLICATIONS

This application claims the benefit of U.S. Provisional Application No. 62/490,001, filed on Apr. 25, 2017, which is incorporated herein by reference.

BACKGROUND OF THE INVENTION

1. Field of the Invention

The present invention relates to a device and a method used in a wireless communication system, and more particularly, to a device and a method of handling communications in dual connectivity.

2. Description of the Prior Art

A fifth generation (5G) (or called new radio (NR)) system provides higher data rate and lower latency for data transmission than those of a long-term evolution (LTE) system. How to improve the performance of configuring measurement object is an important problem to be solved.

SUMMARY OF THE INVENTION

The present invention therefore provides a communication device and method for handling communications in dual connectivity to solve the abovementioned problem.

A network comprising a first base station (BS) and a second BS for handling communications in dual connectivity, comprising the first BS configuring a radio resource control (RRC) connection to a communication device; the first BS transmitting a first measurement configuration via the RRC connection to the communication device, wherein the first measurement configuration comprises a first measurement identity and a first measurement object (MO) identity; the first BS configuring the second BS as a secondary BS to the communication device; the second BS transmitting a second measurement configuration to the communication device via the first BS or via a signalling radio bearer (SRB) configured to the communication device by the second BS, wherein the second measurement configuration comprises a second measurement identity and a second MO identity; the first BS receiving a first measurement report associated to the first measurement configuration via the RRC connection from the communication device; the second BS receiving a second measurement report associated to the second measurement configuration via the first BS or via the SRB from the communication device; and the second BS adding a secondary cell (SCell) of the second BS to the communication device, releasing a SCell of the communication device, or changing a primary SCell of the communication device via the first BS or via the SRB, in response to the second measurement report.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
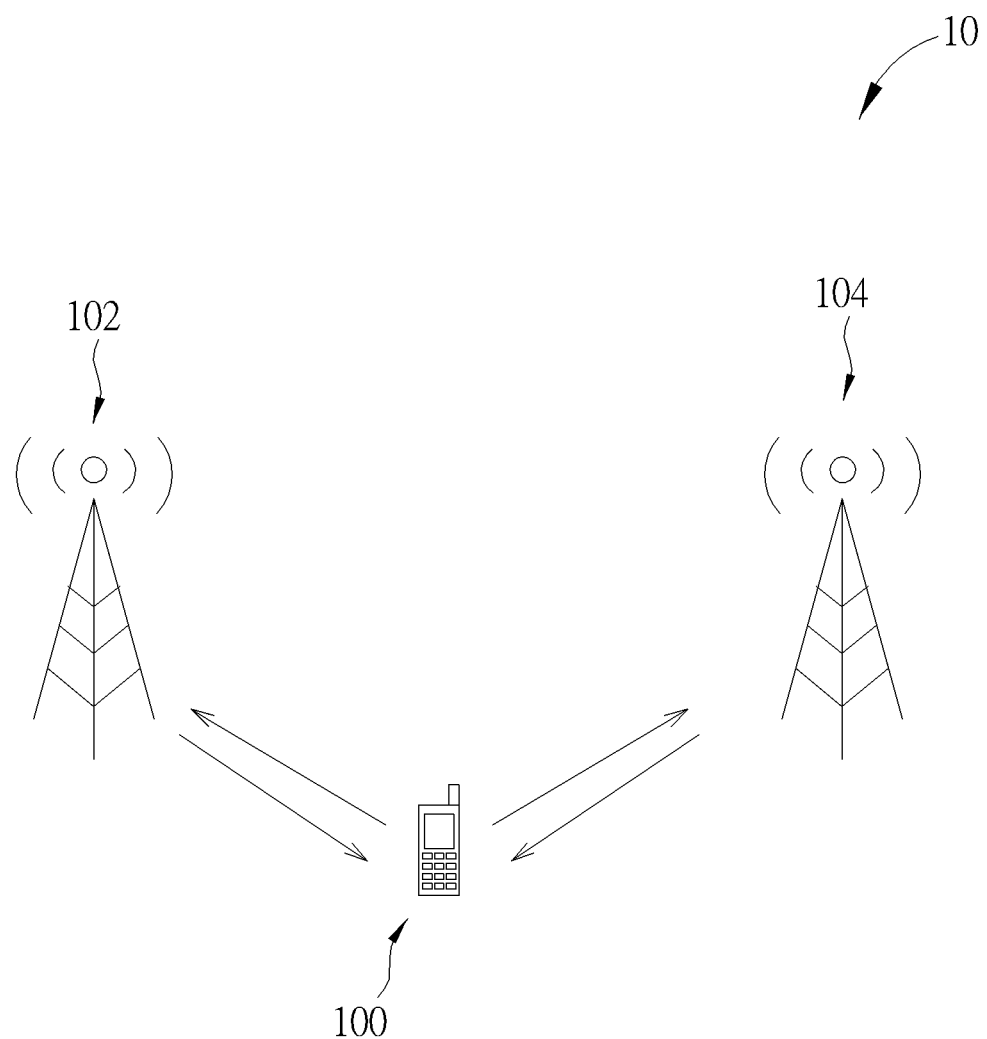
FIG. 1 is a schematic diagram of a wireless communication system according to an example of the present invention.

In FIG. 1, the wireless communication system 10 is composed of a communication device 100, a base station (BS) 102 and a BS 104 for illustrating the structure of the wireless communication system 10.

The communication device 100 may be configured to communicate with the BS 102 and the BS 104 according to dual connectivity (DC). That is, the communication device 100 may perform a transmission/reception via both the BS 102 and the BS 104. One of the BSs 102 and 104 may be a master BS (MBS) and the other one of the BSs 102 and 104 may be a secondary BS (SBS). One of the at least one cell of the MBS communicating with the communication device 100 may be a primary cell (PCell) and the other cell(s) (if available) of the MBS may be secondary cell(s) (SCell(s)). One of the at least one cell of the SBS communicating with the communication device 100 may be a primary SCell (PSCell), and the other cell(s) (if available) of the SBS may be SCell(s). In one example, the BSs 102 or 104 may be an evolved Node B (eNB), a gNB or a next-generation eNB (ng-eNB).

A communication device may be a user equipment (UE), a mobile phone, a laptop, a tablet computer, an electronic book, a portable computer system, a vehicle, a ship or an aircraft.

Figure 2:
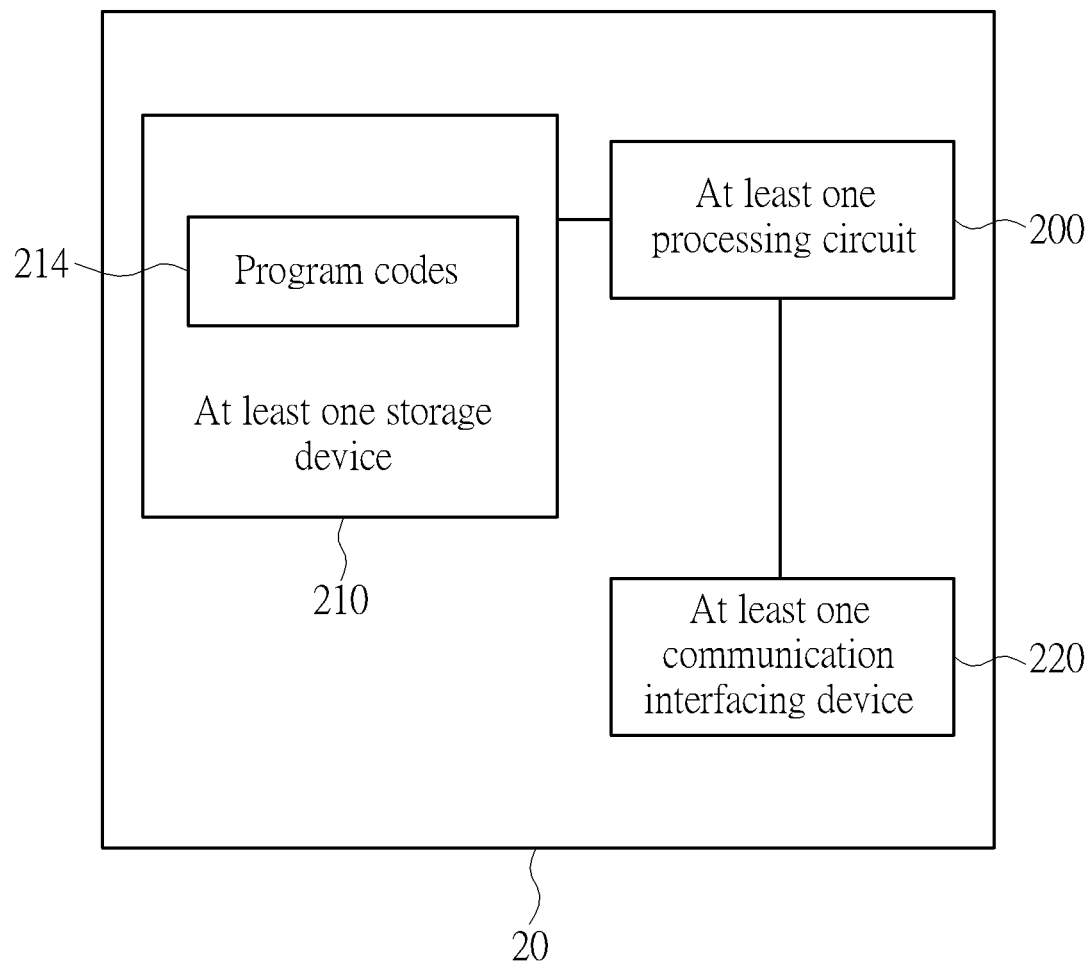
FIG. 2 is a schematic diagram of a communication device according to an example of the present invention.

In FIG. 2, the communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver and is used to transmit and receive signals (e.g., data, messages and/or packets) according to processing results of the at least one processing circuit 200.

In the following examples, a UE is used to represent the communication device 100 in FIG. 1, to simplify the illustration of the embodiments.

Figure 3:
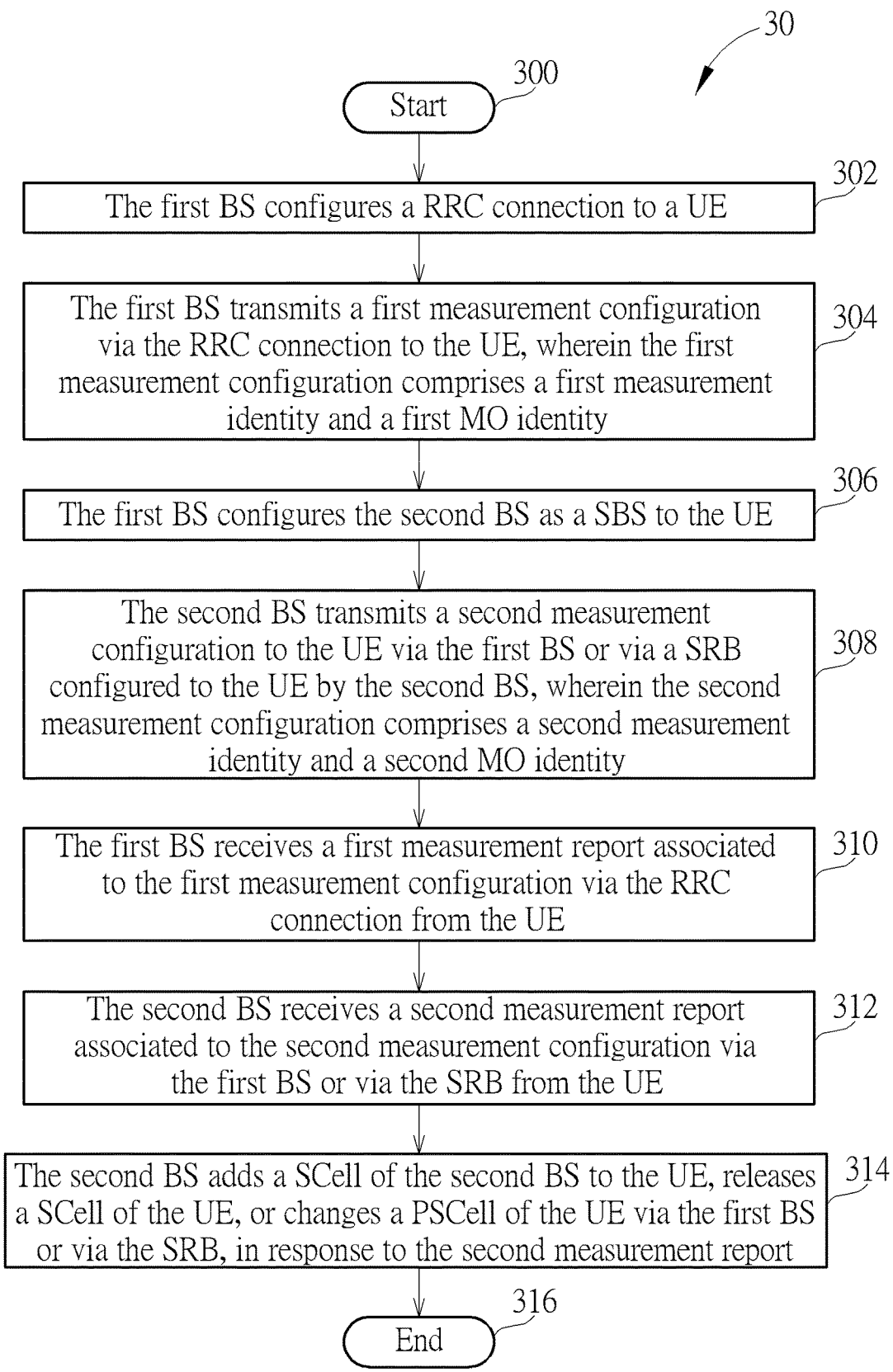
FIG. 3 is a flowchart of a process according to an example of the present invention.

A process 30 in FIG. 3 is utilized in a network including a first BS (e.g., the BS 102 in FIG. 1) and a second BS (e.g., the BS 104 in FIG. 1), and includes the following steps:

Step 300: Start.

Step 302: The first BS configures a radio resource control (RRC) connection to a UE.

Step 304: The first BS transmits a first measurement configuration via the RRC connection to the UE, wherein the first measurement configuration comprises a first measurement identity and a first measurement object (MO) identity.

Step 306: The first BS configures the second BS as a SBS to the UE.

Step 308: The second BS transmits a second measurement configuration to the UE via the first BS or via a SRB configured to the UE by the second BS, wherein the second measurement configuration comprises a second measurement identity and a second MO identity.

Step 310: The first BS receives a first measurement report associated to the first measurement configuration via the RRC connection from the UE.

Step 312: The second BS receives a second measurement report associated to the second measurement configuration via the first BS or via the SRB from the UE.

Step 314: The second BS adds a SCell of the second BS to the UE, releases a SCell of the UE, or changes a PSCell of the UE via the first BS or via the SRB, in response to the second measurement report.

Step 316: End.

In one example, the RRC connection includes a SRB which is a master cell group (MCG) bearer or a MCG split bearer configured by the first BS. In one example, the second BS transmits the second measurement configuration to the first BS, and the first BS transmits the second measurement configuration to the UE via the SRB of the RRC connection. The first BS receives the second measurement report via the SRB of the RRC connection and forwards the second measurement report to the second BS.

In one example, the second BS configures the SRB to the UE by transmitting a configuration of the SRB to the first BS. In one example, the configuration of the SRB is transmitted by the first BS to the UE via the SRB of the RRC connection.

In one example, the first MO identity identifies a first MO, and the second MO identity identifies a second MO. The first MO and the second MO may be same or different. The first MO indicates a first carrier frequency, and the second MO indicates a second carrier frequency. The UE measures the first carrier frequency according to the first MO. The UE measures the second carrier frequency according to the second MO. In one example, measurement result(s) in the first measurement report and measurement result(s) in the second measurement report are made by the UE according to measurements on the first carrier frequency and the second carrier frequency. The measurement result(s) may be in unit of reference signal received power (RSRP) and/or reference signal received quality (RSRQ).

In one example, the first BS and the second BS allocate the first measurement identity and the second measurement identity independently (or respectively). The first measurement identity and the second measurement identity may be the same or different.

In one example, the first BS and the second BS allocate the first MO identity and the second MO identity independently (or respectively). The first MO identity and the second MO identity may be the same or different.

In one example, the first BS transmits the first MO identity to the second BS. The second BS sets the second MO identity different from the first MO identity. That is, the MOs configured by the first BS and the second BS to the UE may be uniquely identified by the MO identities configured to the UE.

In one example, the UE transmits the first measurement report when determining/detecting that a first event occurs, and transmits the second measurement report when determining/detecting that a second event occurs. In one example, the first event is configured in a first reporting configuration, and the second event is configured in a second reporting configuration. The first measurement configuration may include a first reporting configuration identity identifying the first reporting configuration, and the second measurement configuration may include a second reporting configuration identity identifying the second reporting configuration.

In one example, the first BS and the second BS allocate the first reporting configuration identity and the second reporting configuration identity independently (or respectively). The first reporting configuration identity and the second reporting configuration identity may be the same or different. In one example, the first BS transmits the first reporting configuration identity to the second BS. The second BS sets the second reporting configuration identity different from the first reporting configuration identity. That is, the reporting configurations configured by the first BS and the second BS to the UE may be uniquely identified by the reporting configuration identities configured to the UE.

In one example, the second BS adds the SCell of the second BS to the UE, releases the SCell of the UE, or changes the PSCell of the UE via the SRB by transmitting a RRC message including a secondary cell group (SCG) configuration to the UE via the SRB. The second BS may receive a RRC response message from the UE via the SRB.

In one example, the first BS configures the second BS as the SBS to the UE in response to the first measurement report. For example, the first BS may transmit a RRCConnectionReconfiguration message including a SCG configuration configuring the second BS as the SBS to the UE, via the RRC connection.

In one example, the first BS determines to change a PSCell of the UE or to change a PCell of the UE, in response to the first measurement report. For example, the first BS transmits a RRCConnectionReconfiguration message including a SCG configuration for changing the PSCell to a new PSCell to the UE via the RRC connection. The new PSCell may belong to the second BS or a third BS. The first BS transmits a handover command for changing the PCell to a new PCell to the UE via the RRC connection. The new PCell may belong to the first BS or a fourth BS.

Figure 4:
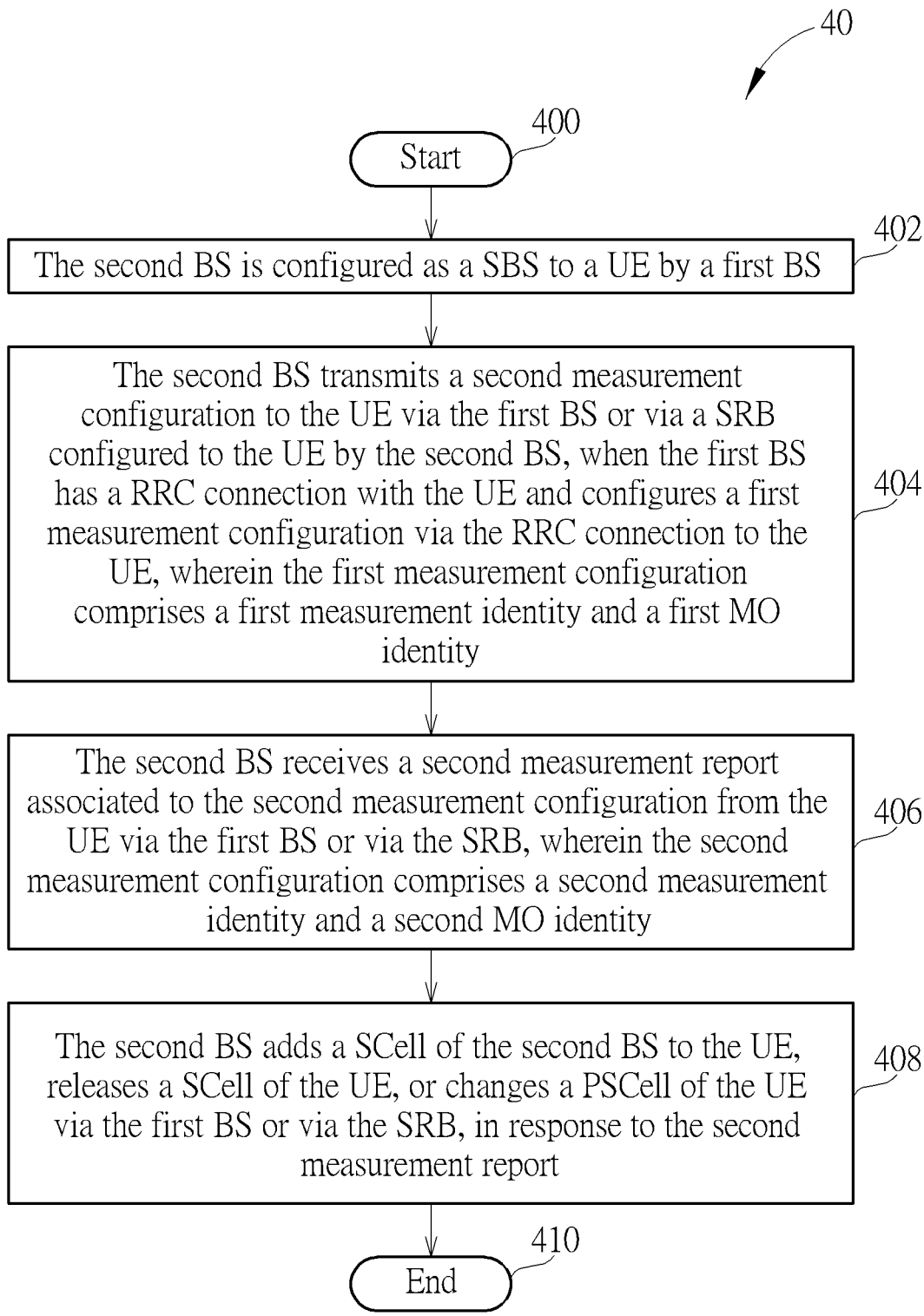
FIG. 4 is a flowchart of a process according to an example of the present invention.

A process 40 as shown in FIG. 4 is utilized in a second BS (e.g., the BS 104 in FIG. 1), and includes the following steps:

Step 400: Start.

Step 402: The second BS is configured as a SBS to a UE by a first BS.

Step 404: The second BS transmits a second measurement configuration to the UE via the first BS or via a SRB configured to the UE by the second BS, when the first BS has a RRC connection with the UE and configures a first measurement configuration via the RRC connection to the UE, wherein the first measurement configuration comprises a first measurement identity and a first MO identity.

Step 406: The second BS receives a second measurement report associated to the second measurement configuration from the UE via the first BS or via the SRB, wherein the second measurement configuration comprises a second measurement identity and a second MO identity.

Step 408: The second BS adds a SCell of the second BS to the UE, releases a SCell of the UE, or changes a PSCell of the UE via the first BS or via the SRB, in response to the second measurement report.

Step 410: End.

The examples of the process 30 may be applied to the process 40, and are not narrated herein.

Figure 5:
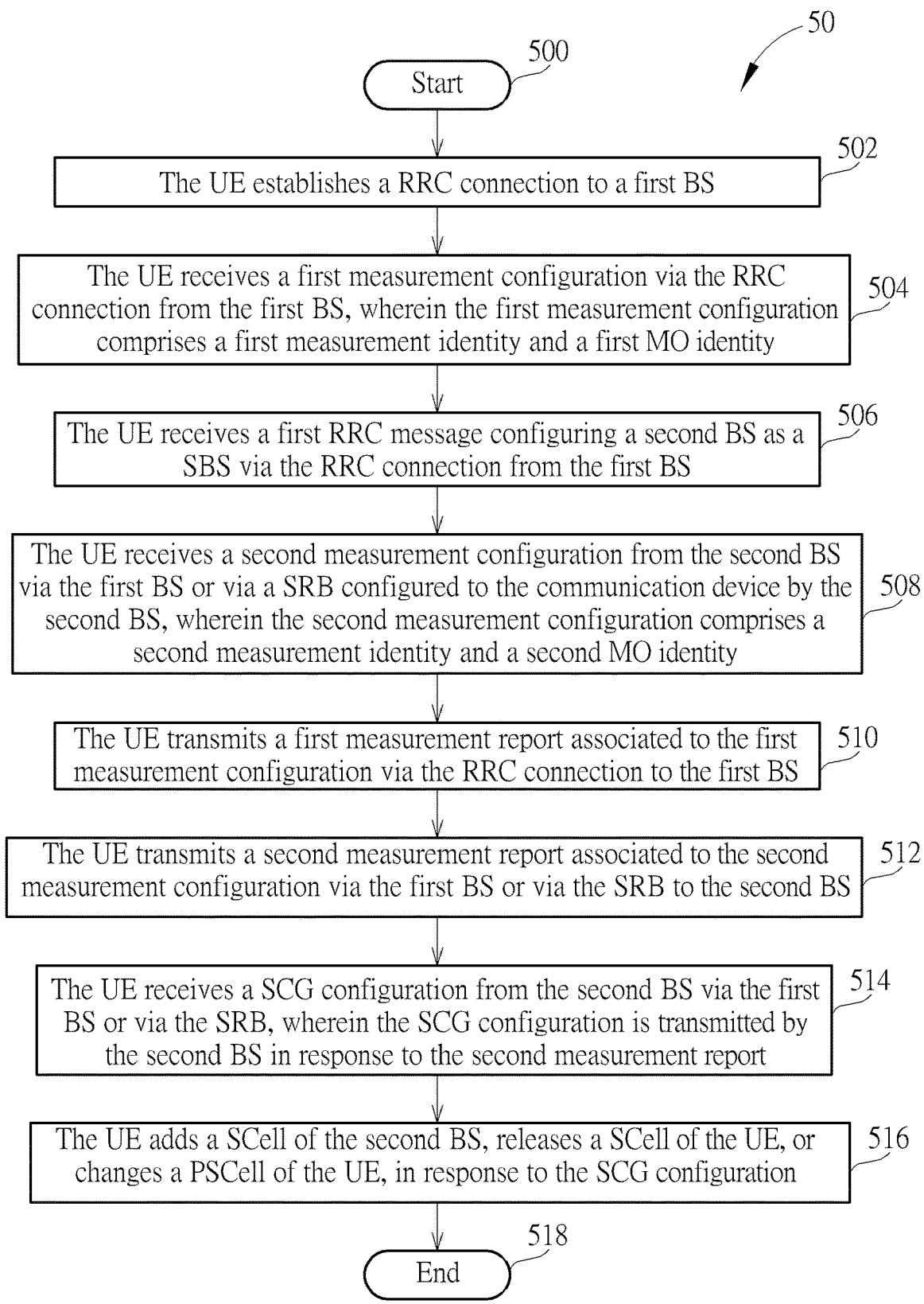
FIG. 5 is a flowchart of a process according to an example of the present invention.

A process 50 as shown in FIG. 5 is utilized in a UE (e.g., the communication device 100 in FIG. 1), and includes the following steps:

Step 500: Start.

Step 502: The UE establishes a RRC connection to a first BS.

Step 504: The UE receives a first measurement configuration via the RRC connection from the first BS, wherein the first measurement configuration comprises a first measurement identity and a first MO identity.

Step 506: The UE receives a first RRC message configuring a second BS as a SBS via the RRC connection from the first BS.

Step 508: The UE receives a second measurement configuration from the second BS via the first BS or via a SRB configured to the communication device by the second BS, wherein the second measurement configuration comprises a second measurement identity and a second MO identity.

Step 510: The UE transmits a first measurement report associated to the first measurement configuration via the RRC connection to the first BS.

Step 512: The UE transmits a second measurement report associated to the second measurement configuration via the first BS or via the SRB to the second BS.

Step 514: The UE receives a SCG configuration from the second BS via the first BS or via the SRB, wherein the SCG configuration is transmitted by the second BS in response to the second measurement report.

Step 516: The UE adds a SCell of the second BS, releases a SCell of the UE, or changes a PSCell of the UE, in response to the SCG configuration.

Step 518: End.

The examples of the processes 30 and 40 may be applied to the process 50, and are not narrated herein. The following examples may be applied to the processes 30-50.

In one example, the first RRC message is generated by the first BS or the second BS. In one example, the UE transmits a first RRC response message to the first BS via the RRC connection in response to the first RRC message. In one example, the UE transmits the first RRC response message to the second BS via the first BS (e.g., the RRC connection) or via the SRB in response to the first RRC message.

In one example, the second measurement configuration is included in the first RRC message, or is included in a second RRC message transmitted via the SRB to the UE. In one example, the second RRC message is generated by the first BS or the second BS. In one example, the UE transmits a second RRC response message to the first BS via the RRC connection in response to the second RRC message. In one example, the UE transmits the second RRC response message to the second BS via the first BS or via the SRB in response to the second RRC message.

In one example, the UE receives a third RRC message including the SCG configuration from the second BS via the first BS or via the SRB, or from the first BS via the RRC connection. In one example, the third RRC message may be generated by the first BS or the second BS. In one example, the UE transmits a third RRC response message to the first BS via the RRC connection in response to the third RRC message. In one example, the UE transmits the third RRC response message to the second BS via the first BS or via the SRB in response to the third RRC message.

It should be noted that the UE may not be able to uniquely identify a measurement configuration with a measurement identity, because the measurement identity may not be unique in both the first BS and the second BS. In addition, according to the prior art, this situation may cause a first issue that a stored measurement configuration is replaced with a newly received measurement configuration, if the measurement identities of the received measurement configuration and the stored measurement configuration are the same.

To solve the first issue, the UE associates the first measurement configuration to the first BS, and associates the second measurement configuration to the second BS. Every measurement configuration (including the first measurement configuration) configured by the first BS has a unique measurement identity. Every measurement configuration (including the second measurement configuration) configured by the second BS has a unique measurement identity. Thus, the UE does not replace the stored measurement configuration (e.g., the first measurement configuration) associated to the first BS with the received measurement configuration (e.g., the second measurement configuration) associated to the second BS. Accordingly, the UE manages (e.g., maintains or keeps) the first measurement configuration received from the first BS and the second measurement configuration received from the second BS, respectively. Thus, the first issue is solved.

The UE may not be able to uniquely identify a MO with a MO identity, because the MO identity may not be unique in both the first BS and the second BS as described above. In addition, according to the prior art, this situation may cause a second issue that a stored MO is replaced with a newly received MO, if the MO identities of the received MO and the stored MO are the same.

To solve the second issue, the UE associates the first MO to the first BS, and associates the second MO to the second BS. Every MO (including the first MO) configured by the first BS has a unique MO identity. Every MO (including the second MO) configured by the second BS has a unique MO identity. Thus, the UE does not replace the stored MO (e.g., the first MO) associated to the first BS with the received MO (e.g., the second MO) associated to the second BS, if the stored MO and the received MO have the same MO identity. Accordingly, the UE manages (e.g., maintains or keeps) the first MO and the second MO, respectively. Thus, the second issue is solved.

The UE may not be able to uniquely identify a reporting configuration with a reporting configuration identity, because the reporting configuration identity may not be unique in both the first BS and the second BS as described above. In addition, according to the prior art, this situation may cause a third issue that a stored reporting configuration is replaced with a newly received reporting configuration, if the reporting configuration identities of the received reporting configuration and the stored reporting configuration are the same.

To solve the third issue, the UE associates the first reporting configuration to the first BS, and associates the second reporting configuration to the second BS. Every reporting reconfiguration (including the first reporting reconfiguration) configured by the first BS has a unique reporting configuration identity. Every reporting reconfiguration (including the second reporting reconfiguration) configured by the second BS has a unique reporting reconfiguration identity. Thus, the UE does not replace the stored reporting configuration (e.g., the first reporting configuration) associated to the first BS with the received reporting configuration (e.g., the second reporting configuration) associated to the second BS. Accordingly, the UE manages (e.g., maintains or keeps) the first reporting configuration and the second reporting configuration, respectively. Thus, the first issue is solved.

In one example, the first measurement report includes the first measurement identity, and the second measurement report includes the second measurement identity.

In one example, the first BS transmits a first MO configuration including the first MO identity and the first MO to the UE via the RRC connection. The second BS may transmit a second MO configuration including the second MO identity and the second MO to the UE via the SRB or via the first BS.

In one example, the first BS transmits a third reporting configuration including the first reporting configuration identity and the first reporting configuration (including a first event identity) to the UE via the RRC connection. The second BS transmits a fourth reporting configuration including the second reporting configuration identity and the second reporting configuration (including a second event identity) to the UE via the SRB or via the first BS.

In one example, the second BS configures the UE to release the second measurement configuration or configures/ adds a third measurement configuration to the UE, e.g., by transmitting a RRC message (e.g., the third RRC message or a fourth RRC message) to the UE via the SRB or via the first BS, in response to the second measurement report. The third measurement configuration may have a different reporting configuration (e.g., a different event) from the second measurement configuration. The UE may transmit a RRC response message (e.g., the third RRC response message or the fourth RRC response message) to the second BS via the SRB or the first BS. The UE may transmit a third measurement report via the SRB or via the first BS to the second BS according to the third measurement configuration.

In one example, the second BS configures the UE to release the second MO configuration or configures/adds a third MO configuration to the UE, e.g., by transmitting a RRC message (e.g., the third RRC message or the fourth RRC message) to the UE, in response to the second measurement report. The third MO configuration may be different from the second MO configuration, e.g., different carrier frequencies or different reference signals. The third measurement configuration may include a third MO identity of the third MO configuration or the second MO identity.

Those skilled in the art should readily make combinations, modifications and/or alterations on the abovementioned description and examples. For example, the measurement identity or the MO identity may be replaced by the reporting configuration identity. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides a method and related communication device for handling MO configurations in dual connectivity. Thus, the performance of configuring MO is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network comprising a first base station (BS) and a second BS for handling communications in dual connectivity, comprising:
   the first BS configuring a radio resource control (RRC) connection to a communication device;
   the first BS transmitting a first measurement configuration via the RRC connection to the communication device, wherein the first measurement configuration comprises a first measurement identity and a first measurement object (MO) identity;
   the first BS configuring the second BS as a secondary BS (SBS) to the communication device;
   the second BS transmitting a second measurement configuration to the communication device via the first BS or via a signalling radio bearer (SRB) configured to the communication device by the second BS, wherein the second measurement configuration comprises a second measurement identity and a second MO identity;
   the first BS receiving a first measurement report associated to the first measurement configuration via the RRC connection from the communication device;
   the second BS receiving a second measurement report associated to the second measurement configuration via the first BS or via the SRB from the communication device; and
   the second BS adding a secondary cell (SCell) of the second BS to the communication device, releasing a SCell of the communication device, or changing a primary SCell (PSCell) of the communication device via the first BS or via the SRB, in response to the second measurement report;
   wherein the first BS and the second BS allocate the first measurement identity and the second measurement identity independently, and allocate the first MO identity and the second MO identity independently.

2. The network of claim 1, wherein the first BS transmits a configuration of the SRB to the communication device via the RRC connection.

3. A second base station (SB) for handling communications in dual connectivity, comprising:
   a storage device; and
   a processing circuit, coupled to the storage device, wherein the storage device stores, and the processing circuit is configured to execute instructions of:
   being configured as a secondary BS (SBS) to a communication device by a first BS;
   transmitting a second measurement configuration to the communication device via the first BS or via a signalling radio bearer (SRB) configured to the communication device by the second BS, when the first BS has a radio resource control (RRC) connection with the communication device and configures a first measurement configuration via the RRC connection to the communication device, wherein the first measurement configuration comprises a first measurement identity and a first measurement object (MO) identity;
   receiving a second measurement report associated to the second measurement configuration from the communication device via the first BS or via the SRB, wherein the second measurement configuration comprises a second measurement identity and a second MO identity; and
   adding a secondary cell (SCell) of the second BS to the communication device, releasing a SCell of the communication device, or changing a primary SCell (PS- Cell) of the communication device via the first BS or via the SRB, in response to the second measurement report;

wherein the first BS and the second BS allocate the first measurement identity and the second measurement identity independently, and allocate the first MO identity and the second MO identity independently.

4. The second BS of claim 3, wherein the second BS configures the SRB to the communication device by transmitting a configuration of the SRB to the first BS, and the configuration of the SRB is transmitted by the first BS to the communication device via the RRC connection.

5. The second BS of claim 3, wherein the second BS adds the SCell of the second BS to the communication device, releases the SCell of the communication device, or changes the PSCell of the communication device via the SRB by transmitting a RRC message comprising a secondary cell group (SCG) configuration to the communication device via the SRB.

6. A communication device for handling communications in dual connectivity, comprising:
a storage device; and
a processing circuit, coupled to the storage device, wherein the storage device stores, and the processing circuit is configured to execute instructions of:
establishing a radio resource control (RRC) connection to a first BS;
receiving a first measurement configuration via the RRC connection from the first BS, wherein the first measurement configuration comprises a first measurement identity and a first measurement object (MO) identity;
receiving a first RRC message configuring a second BS as a secondary BS (SBS) via the RRC connection from the first BS;
receiving a second measurement configuration from the second BS via the first BS or via a signalling radio bearer (SRB) configured to the communication device by the second BS, wherein the second measurement configuration comprises a second measurement identity and a second MO identity;
transmitting a first measurement report associated to the first measurement configuration via the RRC connection to the first BS;
transmitting a second measurement report associated to the second measurement configuration via the first BS or via the SRB to the second BS;
receiving a secondary cell group (SCG) configuration from the second BS via the first BS or via the SRB, wherein the SCG configuration is transmitted by the second BS in response to the second measurement report; and
adding a secondary cell (SCell) of the second BS, releasing a SCell of the communication device, or changing a primary SCell (PSCell) of the communication device, in response to the SCG configuration;
wherein the first BS and the second BS allocate the first measurement identity and the second measurement identity independently, and allocate the first MO identity and the second MO identity independently.

7. The communication device of claim 6, wherein the instructions further comprise:
transmitting a first RRC response message to the first BS via the RRC connection in response to the first RRC message; or
transmitting the first RRC response message to the second BS via the first BS in response to the first RRC message.

8. The communication device of claim 6, wherein the second measurement configuration is comprised in the first RRC message, or is comprised in a second RRC message transmitted via the SRB to the communication device.

9. The communication device of claim 6, wherein the instructions further comprise:
receiving a third RRC message comprising the SCG configuration via the first BS or via the SRB.

10. The communication device of claim 9, wherein the instructions further comprise:
transmitting a third RRC response message to the first BS via the RRC connection in response to the third RRC message; or
transmitting the third RRC response message to the second B S via the first B S or via the SRB in response to the third RRC message.

11. The communication device of claim 6, wherein the instructions further comprise:
associating the first measurement configuration to the first BS; and
associating the second measurement configuration to the second BS.

* * * * *